United States Patent [19]

Shiba et al.

[11] Patent Number: 5,695,603
[45] Date of Patent: Dec. 9, 1997

[54] DEINKING AGENT WITH POLYOXYALKYLENE GROUP CONSISTING OF SPECIFIC BLOCK AND RANDOM ARRANGEMENT UNITS AND METHOD FOR RECLAIMING WASTE PAPER USING SAME

[75] Inventors: Daisuke Shiba; Takanobu Shiroishi; Koji Hamaguchi, all of Wakayama, Japan

[73] Assignee: Kao Corporation, Tokyo, Japan

[21] Appl. No.: 418,805

[22] Filed: Apr. 7, 1995

[30] Foreign Application Priority Data

Apr. 8, 1994 [JP] Japan .................................... 6-070967
Nov. 25, 1994 [JP] Japan .................................... 6-291463

[51] Int. Cl.$^6$ .................... D21C 5/02; C11D 1/722
[52] U.S. Cl. .................... 162/5; 510/174; 510/421; 510/506
[58] Field of Search .................... 510/174, 506, 510/421; 162/5; 252/242, 243

[56] References Cited

U.S. PATENT DOCUMENTS

| | | | |
|---|---|---|---|
| 4,410,447 | 10/1983 | Decker et al. | 252/351 |
| 4,964,949 | 10/1990 | Hamaguchi et al. | 162/5 |
| 5,158,697 | 10/1992 | Kawamori et al. | 252/60 |
| 5,288,369 | 2/1994 | Ishibashi et al. | 162/5 |
| 5,417,808 | 5/1995 | Okamoto et al. | 162/5 |
| 5,460,695 | 10/1995 | Kato | 162/5 |
| 5,583,097 | 12/1996 | Li et al. | 510/174 |
| 5,585,339 | 12/1996 | Hamaguchi et al. | 510/174 |

FOREIGN PATENT DOCUMENTS

| | | |
|---|---|---|
| 55-51892 | 4/1980 | Japan . |
| 4-361681 | 12/1992 | Japan . |
| 5-186985 | 7/1993 | Japan . |
| 5-263379 | 10/1993 | Japan . |

Primary Examiner—Ardith Hertzog
Attorney, Agent, or Firm—Birch, Stewart, Kolasch & Birch, LLP

[57] ABSTRACT

Deinking agent represented by the following formula (I):

$$R\text{—}O\text{—}X\text{—}H \qquad (I)$$

wherein R is derived from a phenolic compound, optionally substituted with a $C_{6-16}$ alkyl or alkenyl (linear or branched) group, or from a $C_{6-16}$ alkyl or alkenyl (linear or branched) higher alcohol, and X represents a polyalkylene group consisting of at least three units arranged in block and at least one unit arranged at random, with both ends of each random unit adjacent to a block unit, and a method of reclaiming waste paper using same.

17 Claims, No Drawings

DEINKING AGENT WITH POLYOXYALKYLENE GROUP CONSISTING OF SPECIFIC BLOCK AND RANDOM ARRANGEMENT UNITS AND METHOD FOR RECLAIMING WASTE PAPER USING SAME

BACKGROUND OF THE INVENTION

1. Field of the Invention

The present invention relates to a deinking agent for reclaiming waste paper, i.e., for regeneration of paper from waste paper. More particularly, it relates to a deinking agent for reclaiming waste paper, which has excellent deinking performances capable of satisfying demands in each deinking step.

2. Description of Related Art

Waste paper is reclaimed by liberating ink from the starting waste paper by a deinking treatment to obtain regenerated pulp and producing reclaimed paper from the pulp.

In recent years, ink is fixed on paper in waste paper as starting material, since a demand for beautiful print of a high quality and stability is increasing and improved printing techniques are being developed. Further, a system of recovering waste paper has been developed, the supply of waste paper to be used as the starting material has been stabilized, and the duration of the storage of waste paper is being prolonged. Thus, the liberation of ink is becoming more and more difficult.

Under these circumstances, the use of a nonionic deinking agent based on a higher alcohol and having excellent ink-liberating properties has remarkably spread.

The functions of the nonionic deinking agent based on a higher alcohol are basically so designed that the higher alcohol skeleton has an ink-liberating function and a polyoxyalkylene group bonded to the higher alcohol skeleton has other important deinking functions (aggregation, foaming, collection and defoaming). In many of techniques disclosed hitherto, the arrangement of the polyoxyalkylene group is designed so as to increase the deinking performances.

The performances required of the deinking agent to be used for the deinking treatment in, for example, a flotation method are as follows:

(1) a high power of liberating ink from waste paper, (2) a suitable power of aggregating ink, (3) a suitable foaming power and a suitable collecting power for adsorbing the aggregated ink, and (4) a defoaming power for efficiently conducting the operation.

The deinking agent must have well-balanced performances (1) to (4).

As for the arrangement of the polyoxyalkylene group, its arrangement in a conventional deinking agent can be classified into the following four patterns:

A. an arrangement of two or more kinds of (poly)oxyalkylene units, indispensably including a (poly)oxyethylene unit, in block, B. a random arrangement of two or more kinds of oxyalkylene groups indispensably including an oxyethylene group, C. a structure consisting of two or three kinds of arranged units, which are block arrangements or a mixture of block arrangement(s) and random arrangement(s), wherein an oxyethylene group is included as an indispensable component [refer to Japanese Patent Publication-A Nos. 4-361881 (published on Dec. 15, 1992) and 5-186985 (published on Jul. 27, 1993)], and D. a structure in which a (poly)oxyethylene unit or a mixed polyoxyalkylene unit including an oxyethylene group as an indispensable component is interposed between the blocks of arranged (poly)oxypropylene groups [refer to Japanese Patent Publication-A No. 5-263379 (published on Oct. 12, 1993)].

After detailed investigations, it has been found that when each of the numbers of the oxyalkylene groups in the arrangements is substantially fixed, the respective deinking agents have the following merits and detriments:

(1) The deinking agent A having only block arrangements exhibits a high ink-collecting efficiency but a low foaming power. Therefore, in the flotation method by which the foaming power is weak, the quantity of the foams is insufficient for always thoroughly removing the liberated ink.

(2) With respect to the deinking agent B having a completely random arrangement, it exhibits a low ink-collecting efficiency and the defoaming is difficult, though it exhibits a high foaming power and a low foam viscosity. Thus, the life of the foams is so long as to cause trouble with overflow of the foams in a discharging step in the flotation method.

(3) With respect to the deinking agent C, the defoaming is difficult and the ink-collecting efficiency thereof is lower than that of the deinking agent A having only block arrangements, though its foaming power is strong. As a result, the liberated ink cannot be sufficiently removed and the same trouble of the foams as in (2) is caused in the discharging step in the flotation method.

(4) The deinking agent D exhibits only a weak foaming power and a high foam viscosity and, therefore, the quantity of the foams is insufficient and the foams are difficultly moved in the flotation method by which the foaming power is weak.

Therefore, the objects of the present invention are to improve the foaming power to such an extent that no trouble is caused in the step of discharging the foams without reducing the ink-collecting efficiency and defoaming effect of the nonionic deinking agent based on the higher alcohol, and thereby to increase the amount of the liberated ink removed in the flotation. Another object is to accomplish the above objects without increasing the production cost.

DISCLOSURE OF THE INVENTION

SUMMARY OF THE INVENTION

After investigations on the relationship between the arrangement patterns of polyoxyalkylene groups in deinking agents used hitherto and the deinking performances thereof, the present inventors have found that the above-described objects can be accomplished by a compound, i.e., a deinking agent, of which chemical structure is designed based on the formation of block arrangements having a high ink-removing efficiency, and in which a random arrangement having such a size that it does not lower the deinking efficiency is interposed between the block arrangements.

Thus, the present invention provides a deinking agent for reclaiming waste paper represented by the following formula (I):

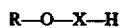

R—O—X—H        (I)

wherein R represents a residue formed by removing one hydroxyl group from a compound having one hydroxyl group, X represents a polyoxyalkylene group consisting of at least three units arranged in block and at least one unit(s) arranged at random, and both ends of the unit of the random arrangement are each adjacent to a unit of the block arrangement, each of the units of the block arrangement being selected from the group consisting of:

(1) $[E_m]$: a (poly)oxyethylene unit arranged in block which consists of at least one oxyethylene group(s), and (2) $[As_x]$: a $C_sH_{2s}O$ ($s \geq 3$) unit arranged in block which consists of at least one oxyalkylene group(s), said at least three units arranged in block containing at least one $[E_m]$('s) and at least one $[As_x]$('s), and said unit(s) of the random arrangement being selected from the group consisting of:

(3) $[E_{m'}/As'_{x'}]$: a unit arranged at random consisting of at least one oxyethylene group(s) and at least one $C_{s'}H_{2s'}O$ ($s' \geq 3$) group(s), and (4) $[As''_{x''}/As'''_{x'''}]$: a unit arranged at random consisting of at least one $C_{s''}H_{2s''}O$ ($s'' \geq 3$) group(s) and at least one $C_{s'''}H_{2s'''}O$ ($s''' \geq 3$) group(s) wherein $s'' \neq s'''$.

In the above items (1) to (4), m, m', x, x', x" and x'" are each the number of oxyalkylene group(s).

In the above items (2) to (4), s, s', s" and s'" are each preferably 3 or 4.

When X comprises a unit arranged at random represented by $[E_{m'}/As'_{x'}]$ and another unit arranged at random represented by $[As''_{x''}/As'''_{x'''}]$, it is preferred that As' is the same as As" or As'".

Each of the units of the block arrangement generally consists of at least two oxyalkylene groups, and the unit(s) of the random arrangement generally consists of at least one oxyalkylene group(s) and at least two other oxyalkylene groups. That is, each of the unit of the block arrangement generally consists of at least two oxyalkylene groups, and the unit(s) of the random arrangement generally consists of at least three oxyalkylene groups.

The term "block arrangement" means a unit formed by an addition reaction with one kind of alkylene oxide, while the term "random arrangement" means a unit formed by an addition reaction with a mixture of two or more kinds of alkylene oxides.

Further, the present invention provides a method for deinking waste paper which comprises applying a deinking agent to waste paper, represented by the above formula (I).

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The polyoxyalkylene group, X, in the deinking agent represented by the formula (I) contains at least three units of the block arrangement. At least one of these units of the block arrangement must be a (poly)oxyethylene unit arranged in block in order to assure suitable hydrophilic and defoaming properties. At least one of these units of the block arrangement must be the $C_sH_{2s}O$ ($s \geq 3$) unit arranged in block. The polyoxyalkylene group, X, in the deinking agent represented by the formula (I) also contains at least one unit(s) of the random arrangement. The unit of the random arrangement must be introduced between the units arranged in block. When the deinking agent has two or less units of the block arrangement or when the unit of the random arrangement is at an oxygen terminal or hydrogen terminal in the formula (I) [namely when the unit of the random arrangement is bonded to the oxygen atom or hydrogen atom in formula (I)], the foams are formed in an excess amount and the deinking efficiency is low.

To reduce the production cost, it is desirable that each of both ends of the units of the random arrangement in X of the formula (I) is adjacent to a unit of the block arrangement consisting of any of the oxyalkylene groups constituting the unit of the random arrangement.

The deinking agent represented by the formula (I) is obtained by adding alkylene oxides to a compound having one hydroxyl group. Examples of the compounds having one hydroxyl group to which the alkylene oxides are to be added include higher alcohols and phenolic compounds.

Among higher alcohols, preferably are those having a linear or branched alkyl or alkenyl group having 8 to 24 carbon atoms, and particularly preferably are primary alcohols and secondary alcohols. When the higher alcohol has less than 8 carbon atoms, the deinking agent prepared therefrom has a low ink-collecting power and, on the contrary, when it has more than 24 carbon atoms, the deinking agent prepared therefrom has a low ink-liberating power. Examples of the higher alcohols include octanol, nonanol, decanol, undecanol, dodecanol, tetradecanol, hexadecanol, octadecanol, eicosyl alcohol, docosyl alcohol, 2-ethylhexanol and 2-ethylundecanol.

Examples of the phenolic compounds include phenol; substituted phenols such as cresol, xylenol, butylphenol, nonylphenol, dodecylphenol, aminophenol and hydroxybenzoic acid; naphthol; and substituted naphthols such as methylnaphthol, butylnaphthol and octylnaphthol. When a substituted phenol having a linear or branched alkyl or alkenyl group having 6 to 16 carbon atoms is employed as the starting material, the deinking agent prepared therefrom preferably has a high ink-collecting power and a high ink-liberating power.

From the viewpoint of the ink-liberating power, preferred are substituted phenols having a linear or branched alkyl or alkenyl group having 6 to 16 carbon atoms and higher alcohols having a linear or branched alkyl or alkenyl group having 8 to 24 carbon atoms as the starting material among the above-mentioned hydroxyl group-containing compounds. The most desirable are higher alcohols having a linear or branched alkyl or alkenyl group having 8 to 24 carbon atoms.

Among the deinking agents for reclaiming waste paper according to the present invention, those wherein a $C_3H_6O$ or $C_4H_8O$ unit of the block arrangement is bonded to each of the oxygen atom and the hydrogen atom in the formula (I) have excellent ink-collecting power and defoaming power. From the economical viewpoint, a compound of the formula (I) wherein a $C_3H_6O$ unit of the block arrangement is bonded to either the oxygen atom or the hydrogen atom is preferred, and a compound wherein a $C_3H_6O$ unit of the block arrangement is bonded to both of the oxygen atom and the hydrogen atom is still preferred. Among the deinking agents of the formula (I), such a compound as above and wherein X has the following arrangement is particularly preferred:

(a) a compound wherein X is a polyoxyalkylene group represented by the following formula (II):

$$[As_x][As_{x'}/E_{m1}][E_m][E_{m2}/At_n][At_{n'}] \qquad (II)$$

wherein As represents $C_sH_{2s}O$ (s being 3 or 4), At represents $C_tH_{2t}O$ (t being 3 or 4), E represents $C_2H_4O$, x, x', m, m1, m2, n and n' each represents a number of the oxyalkylene group which is as follows: $x \geq 1$, $x' \geq 1$, m1+m+m2 $\geq 5$, m1 $\geq 1$, m $\geq 1$, m2 $\geq 1$, n $\geq 1$, n' $\geq 1$, and $[As_{x'}/E_{m1}]$ and $[E_{m2}/At_n]$ are each a unit arranged at random, (b) a compound wherein X is a polyoxyalkylene group represented by the following formula (III):

$$[As_x][E_m][E_{m2}/At_{n'}][At_n] \quad (III)$$

wherein As represents $C_sH_{2s}O$ (s being 3 or 4), At represents $C_tH_{2t}O$ (t being 3 or 4), E represents $C_2H_4O$, x, m, m2, n and n' each represents a number of the oxyalkylene group which is as follows: $x \geq 1$, $m+m2 \geq 5$, $m \geq 1$, $m2 \geq 1$, $n \geq 1$, $n' \geq 1$, and $[E_{m2}/At_{n'}]$ is a unit arranged at random, and (c) a compound wherein X is a polyoxyalkylene group represented by the following formula (IV):

$$[As_x][As_{x'}/E_{m1}][E_m][At_n] \quad (IV)$$

wherein As represents $C_sH_{2s}O$ (s being 3 or 4), At represents $C_tH_{2t}O$ (t being 3 or 4), E represents $C_2H_4O$, x, x', m, m1 and n each represents a number of the oxyalkylene group which is as follows: $x \geq 1$, $x' \geq 1$, $m_1+m \geq 5$, $m1 \geq 1$, $m \geq 1$, $n \geq 1$, and $[As_{x'}/E_{m1}]$ is a unit arranged at random.

The compounds represents by the above formulas (II) to (IV) are prepared by adding a single alkylene oxide and a mixture of two alkylene oxides successively to the starting compound having one hydroxyl group by a known method.

Among the above-described compounds, those having a particularly high ink-collecting efficiency and excellent defoaming properties with a controlled amount of the foams formed, and having an arrangement capable of being easily synthesized are compounds (a) having an arrangement represented by the formula (II). Compounds having higher ink-collecting efficiency and more excellent defoaming properties with a more strictly controlled amount of the foams formed, and having an arrangement capable of being more easily synthesized, compared with compounds (a), are compounds (b) having an arrangement represented by the formula (III). Compounds having an arrangement capable of being synthesized as easily as those of the formula (III) and having defoaming properties more excellent than those of the compound (b) are compounds (c) having an arrangement represented by the formula (IV).

Compounds having a higher deinking performance can be prepared by limiting the molar number of addition of the alkylene oxide. Namely, preferred are compounds of the above formula (I) wherein X is an arrangement of the above formula (II), (III) or (IV) and each of the numbers of the oxyalkylene groups satisfies the following conditions (1) to (5):

(1) $x + x' < 300$,
(2) $m1 + m + m2 < 300$,
(3) $n' + n < 300$,
(4) $x + x' + m1 + m + m2 + n' + n = 12$ to 900, and
(5) a randomization rate of $$5 \leq \frac{x' + m1 + m2 + n'}{x + x' + m1 + m + m2 + n' + n} \times 100 < 80.$$

When each of the numbers of the oxyalkylene group is not within this range, such a compound exhibits reduced superiority in some of the deinking performances (liberation, aggregation, foaming, collection and defoaming).

When the accuracy of the addition reaction is taken into consideration, the randomization rate is desirably not below 5% for surely attaining the random arrangement.

When X is the arrangement represented by the above formula (III), the conditions (1) to (5) described above are as follows:

(1) $x < 300$,
(2) $m + m2 < 300$,
(3) $n' + n < 300$,
(4) $x + m + m2 + n' + n = 12$ to 900, and
(5) a randomization rate of $$5 \leq \frac{m2 + n'}{x + m + m2 + n' + n} \times 100 < 80.$$

When X is the arrangement represented by the above formula (IV), the conditions (1) to (5) described above are as follows:

(1) $x + x' < 300$,
(2) $m_1 + m < 300$,
(3) $n < 300$,
(4) $x + x' + m1 + m + n = 12$ to 900, and
(5) a randomization rate of $$5 \leq \frac{x' + m1}{x + x' + m1 + m + n} \times 100 < 80.$$

Still preferred are compounds of the above formula (I) wherein X is an arrangement of the above formula (II), (III) or (IV) and each of the numbers of the oxyalkylene groups satisfies the following conditions (6) to (11):

(6) $5 \leq x + x' < 50$,
(7) $m1 + m + m2 < 50$,
(8) $5 \leq n' + n < 50$,
(9) $(m1 + m + m2)/(x + x' + n' + n) = 3/1$ to $1/2$,
(10) $x + m + n = 12$ to 200, and
(11) a randomization rate of $$5 \leq \frac{x' + m1 + m2 + n'}{x + x' + m1 + m + m2 + n' + n} \times 100 < 60.$$

When X is the arrangement represented by the above formula (III), the conditions (6) to (11) described above are as follows:

(6) $5 \leq x < 50$,
(7) $m + m2 < 50$,
(8) $5 \leq n' + n < 50$,
(9) $(m + m2)/(x + n' + n) = 3/1$ to $1/2$,
(10) $x + m + n = 12$ to 200, and
(11) a randomization rate of $$5 \leq \frac{m2 + n'}{x + m + m2 + n' + n} \times 100 < 60.$$

When X is the arrangement represented by the above formula (IV), the conditions (6) to (11) described above are as follows:

(6) $5 \leq x + x' < 50$,
(7) $m1 + m < 50$,
(8) $5 \leq n < 50$,
(9) $(m1 + m)/(x + x' + n) = 3/1$ to $1/2$,
(10) $x + m + n = 12$ to 200, and
(11) a randomization rate of $$5 \leq \frac{x' + m1}{x + x' + m1 + m + n} \times 100 < 60.$$

The term "the number of the oxyalkylene group" herein is represented by a molar number of an alkylene oxide used for introducing the oxyalkylene group into a starting compound, that is, an average molar number of alkylene oxide added per mol of the starting compound having one hydroxyl group such as a higher alcohol.

The description will be made on an embodiment of the processes for producing the deinking agent of the present invention. For example, a compound of formula (I) wherein X is represented by the formula (IV) is produced as follows: a catalytic amount of an alkaline substance is added to a higher alcohol, then a predetermined amount of propylene oxide (hereinafter referred to simply as "PO") or butylene oxide (hereinafter referred to simply as "BO") is added to the resultant mixture to conduct the addition reaction and thereafter, the random addition polymerization with ethylene oxide (hereinafter referred to simply as "EO"), and PO or BO is conducted. Then, a predetermined amount of EO is added singly, the random addition polymerization with EO and PO or BO is conducted again and finally a predetermined amount of PO or BO is added. A deinking agent of the present invention having another arrangement can be produced in the same manner as that described above. This process is only an example and the deinking agent of the present invention can also be produced by another process, as a matter of course.

The deinking agent for reclaiming waste paper according to the present invention is improved in foaming power, compared with a conventional deinking agent produced by merely adding alkylene oxides in block to a starting compound having one hydroxyl group such as a higher alcohol. Since the deinking agent of the present invention has also desired defoaming properties and deinking efficiency, this deinking agent is usable in such a deinking step that the amount of the foams is insufficient when the conventional deinking agent is used.

Although another conventional deinking agent produced by adding alkylene oxides at random to a starting compound having one hydroxyl group such as a higher alcohol causes troubles in the operation and impairs the quality of the deinked pulp, since it forms an excess amount of foams and exhibit no desired defoaming properties and deinking efficiency, the deinking agent of the present invention is free from such troubles.

The deinking agent of the present invention may be applied to deinking processes such as flotaion and washing.

EXAMPLES

The present invention will now be described in more detail with reference to the following Examples which should not be considered to limit the scope of the present invention. In the Examples, percentages are given by weight unless otherwise stated.

PRODUCTION EXAMPLES (1) Production of the compound of Comparative Example 1-1

118.9 g of stearyl alcohol was reacted with 3.52 g of KOH at 105° C. under 40 mmHg for 30 minutes to conduct the dehydration. Next, 124.6 g of PO was added to the resultant compound (120° C., 3 to 4 kg/cm$^2$), and then the reaction mixture was maintained at 120° C. for 3 hours to effect aging. Next, 378.1 g of EO was added to the resultant compound (150° C., 3 to 4 kg/cm$^2$), and then the reaction mixture was maintained at 150° C. for 30 minutes to effect aging. Further, 373.9 g of PO was added to the obtained compound (120° C., 3 to 4 kg/cm$^2$), and then the reaction mixture was maintained at 120° C. for 3 hours to effect aging. The reaction mixture was cooled to 80° C. and the pH thereof was adjusted to 6 with acetic acid to obtain the intended compound.

(2) Production of the compound of Example 1-1

118.9 g of stearyl alcohol was reacted with 3.52 g of KOH at 105° C. under 40 mmHg for 30 minutes to conduct the dehydration. Next, 99.7 g of PO was added to the resultant compound (120° C., 3 to 4 kg/cm$^2$), 151.2 g of EO and 149.6 g of PO were added to the resultant compound at random (135° C., 3 to 4 kg/cm$^2$), 75.6 g of EO was added to the resultant compound (150° C., 3 to 4 kg/cm$^2$), 151.2 g of EO and 149.6 g of PO were added to the resultant compound at random (135° C., 3 to 4 kg/cm$^2$), and, further, 99.7 g of PO was added to the resultant compound (120° C., 3 to 4 kg/cm$^2$). Then, the reaction mixture was maintained at 120° C. for 3 hours to effect aging. The reaction mixture was cooled to 80° C. and the pH thereof was adjusted to 6 with acetic acid to obtain the intended compound.

(3) Production of the compound of Example 1-6

118.9 g of stearyl alcohol was reacted with 3.52 g of KOH at 105° C. under 40 mmHg for 30 minutes to conduct the dehydration. Next, 124.6 g of PO was added to the resultant compound (120° C., 3 to 4 kg/cm$^2$), 94.5 g of EO and 149.6 g of PO were added to the resultant compound at random (135° C., 3 to 4 kg/cm$^2$), 283.5 g of EO was added to the resultant compound (150° C., 3 to 4 kg/cm$^2$) and, further, 249.3 g of PO was added to the resultant compound (120° C., 3 to 4 kg/cm$^2$). Then, the reaction mixture was maintained at 120° C. for 3 hours to effect aging. The reaction mixture was cooled to 80° C. and the pH thereof was adjusted to 6 with acetic acid to obtain the intended compound.

(4) Production of compounds

Compounds given in Tables 1 to 4 were produced in accordance with the processes described in above items (1) to (3). In Tables 1 to 4, the numbers of oxyalkylene groups, x, x', m1, m2, m, n and n', in the respective compounds are represented by the molar numbers of the alkylene oxide added per mol of the hydroxyl group-containing compound as the starting material. Oxyethylene group, oxypropylene group and oxybutylene group are hereinafter abbreviated to simply as "OE", "OP" and "OB", respectively.

Examples 1 to 13 and Comparative Examples 1 to 13

A heat-deteriorated waste paper from which the ink was very difficult to liberate while easily foaming during its deinking processes was deinked by the steps described below to confirm the effect of the deinking agents of the present invention.

Experimental method (1) a heat-deteriorated waste paper[*1] is cut into pieces of a size of 2×5 cm.

(2) A predetermined amount of the cut pieces of the heat-deteriorated waste paper[*1] are fed into a bench disintegrator, and then warm water[*2], sodium hydroxide (0.8% based on the weight of the waste paper), sodium silicate (2.2% based on the weight of the waste paper), 30% aqueous hydrogen peroxide solution (3.5% based on the weight of the waste paper) and a deinking agent given in Tables 1 to 4 (0.5% based on the weight of the waste paper) are added to the waste paper[*1]. The concentration of the waste paper[*1] and temperature are controlled at 15% and 45° C., respectively.

(3) The waste paper[*1] is disintegrated at 45° C. for 10 minutes to obtain a pulp slurry.

(4) After the completion of the disintegration, the resultant mixture is diluted with water[*2] to be a pulp concentration of 4%.

(5) The mixture is dehydrated with a high velocity dehydrator to control the pulp concentration at 25%.

(6) The pulp slurry having the pulp concentration of 25% is maintained at a temperature of 55° C. for 120 minutes to effect aging.

(7) The pulp slurry thus obtained is subjected to kneading treatment with a laboratory kneader (double-screw type, rotation rate: 200 rpm).

(8) The pulp slurry after the completion of the kneading treatment is diluted with water*² to be a pulp concentration of 4%.

(9) The disintegration is conducted for 3 minutes with the bench disintegrator.

(10) Warm water*² is added to the disintegrated pulp slurry to adjust the pulp concentration to 1%.

(11) A pulp sheet is prepared from a part of the pulp slurry with TAPPI sheet machine (Fb sheet).

(12) The temperature of the balance of the pulp slurry is adjusted to 30° C.

(13) The pulp slurry is subjected to flotation treatment at 30° C. for 10 minutes. In this step, the amount of foams of flotation rejects is determined and defoaming property are evaluated at the same time. The total amount of foams of the flotation rejects is also determined in this step.

(Determination of the amount of foams)

Three minutes after the initiation of the flotation, the foams discharged are taken into a 2 l cylinder and the amount of the foams ($H_0$) is determined immediately thereafter.

(Evaluation of defoaming property)

The defoaming property in flotation rejects is evaluated from a foam breaking rate calculated by the following formula:

Foam breaking rate (%)=[($H_0-H_1$)/$H_0$]×100 wherein $H_1$ represents the amount of the foams one minute after collection in the cylinder and $H_0$ represents the amount of the foams immediately after collection in the cylinder.

The lower the values of $H_0$ and $H_1$ and the higher the foam breaking rate, the better the defoaming properties.

(14) Pulp sheet is prepared from a part of the pulp slurry after the flotation, with TAPPI sheet machine (Fa sheet).

(15) The balance of the pulp slurry is passed through a mesh wire (#80) to concentrate it to a pulp concentration of 20%.

(16) The resultant pulp slurry is diluted to a pulp concentration of 1% with water*².

(17) A pulp sheet is prepared from the resultant pulp slurry with TAPPI sheet machine (Wa sheet).

(18) The degrees of whiteness of the obtained pulp sheets (Fb, Fa and Wa) are determined with a differential colorimeter (diffuse reflection t-type).

The points (pt) calculated by the formula: [degree of whiteness of Fa sheet (%)]−[degree of whiteness of Fb sheet (%)] as the difference in degrees of whiteness, and degree of whiteness of the deinked pulp (Wa) are given in Tables 1 through 4.

The deinking rate defined by the following formula is calculated from the total amount of foams of the flotation rejects and the difference in the degrees of whiteness of the pulp sheets to evaluate the deinking efficiency of a unit volume of the foams:

$$\text{Deinking rate} = \frac{\left(\begin{array}{c}\text{Degree of}\\\text{whiteness}\\\text{of } Fa \text{ sheet}\end{array}\right) - \left(\begin{array}{c}\text{Degree of}\\\text{whiteness}\\\text{of } Fb \text{ sheet}\end{array}\right) (pt)}{\text{Amount of foams of flotation rejects } (l)} \times 100$$

The unit of the deinking rate in the above formula is point/l (pt/l).

The higher the deinking rate, the lower the amount of the foams necessitated for efficiently collecting the liberated ink.

Notes)

*1: The heat-deteriorated waste paper is obtained by mixing a waste water (the one obtained by heat-treating the residual paper of an offset-printed news paper at 80° C. for one month) with fliers in a ratio of 80/20.

*2: The water to be used has a hardness of 5° DH. The hardness is controlled with $CaCl_2$ and $MgCl_2$ in such amounts that the molar ratio of Ca to ME in the water having a hardness of 5° DH would be 8/2.

TABLE 1

| | | Compound of formula (I) | | | | | Randomization rate (%) | Amount of foams of flotation rejects (ml) | Breaking rate of flotation rejects (%) | Difference in degrees of whiteness of deinked pulps between before and after flotation (pt) | Deinking rate (pt/l) | Degree of whiteness of deinked pulp (%) |
|---|---|---|---|---|---|---|---|---|---|---|---|---|
| | R | $As_X$ | $As_X/E_{m1}$ | $E_m$ | $E_{m2}/At_x$ | $At_n$ | | | | | | |
| Comp. Ex. 1-1 | $C_{18}H_{37}$ | $OP_5$ | | $OE_{20}$ | | $OP_{15}$ | 0 | 430 | 76 | 3.5 | 8.14 | 49.5 |
| Comp. Ex. 1-2 | $C_{18}H_{37}$ | $OP_5$ | $OP_{10}/OE_{20}$ | | | $OP_5$ | 75 | 780 | 55 | 3.5 | 4.49 | 48.9 |
| Comp. Ex. 1-3 | $C_{18}H_{37}$ | | $OP_{20}/OE_{20}$ | | | | 100 | 900 | 40 | 3.1 | 3.44 | 48.2 |
| Ex. 1-1 | $C_{18}H_{37}$ | $OP_4$ | $OP_4/OE_8$ | $OE_4$ | $OE_8/OP_6$ | $OP_4$ | 70 | 680 | 61 | 4.0 | 5.88 | 50.2 |
| Ex. 1-2 | $C_{18}H_{37}$ | $OP_5$ | $OP_3/OE_6$ | $OE_9$ | $OE_3/OP_3$ | $OP_9$ | 43 | 660 | 63 | 4.2 | 6.36 | 50.4 |
| Ex. 1-3 | $C_{18}H_{37}$ | $OP_5$ | $OP_3/OE_5$ | $OE_{13}$ | $OE_5/OP_2$ | $OP_{10}$ | 30 | 630 | 65 | 4.3 | 6.83 | 50.5 |
| Ex. 1-4 | $C_{18}H_{37}$ | $OP_5$ | | $OE_{10}$ | $OE_{10}/OP_5$ | $OP_{10}$ | 38 | 610 | 69 | 4.5 | 7.38 | 50.7 |
| Ex. 1-5 | $C_{18}H_{37}$ | $OP_5$ | $OP_5/OE_{10}$ | $OE_{10}$ | | $OP_{10}$ | 38 | 600 | 72 | 4.6 | 7.67 | 50.8 |
| Ex. 1-6 | $C_{18}H_{37}$ | $OP_5$ | $OP_5/OE_5$ | $OE_{15}$ | | $OP_{10}$ | 25 | 580 | 72 | 4.8 | 7.81 | 51.1 |
| Comp. Ex. 2-1 | $C_{18}H_{37}$ | $OP_{10}$ | | $OE_{30}$ | | $OP_{20}$ | 0 | 490 | 73 | 3.6 | 7.35 | 49.2 |
| Comp. Ex. 2-2 | $C_{18}H_{37}$ | $OP_{10}$ | $OP_5/OE_{30}$ | | | $OP_{15}$ | 58 | 870 | 49 | 3.5 | 4.02 | 49.1 |
| Ex. 2-1 | $C_{18}H_{37}$ | $OP_{10}$ | $OP_5/OE_{10}$ | $OE_{16}$ | $OE_2/OP_2$ | $OP_{13}$ | 32 | 660 | 69 | 4.6 | 6.97 | 50.9 |
| Ex. 3 | $C_{18}H_{37}$ | $OB_3$ | | $OE_{10}$ | $OE_{10}/OB_5$ | $OB_{10}$ | 39 | 650 | 67 | 4.5 | 6.92 | 50.7 |
| Ex. 4 | $C_{18}H_{37}$ | $OB_3$ | $OB_5/OE_{10}$ | $OE_{10}$ | | $OP_{10}$ | 39 | 630 | 70 | 4.7 | 7.46 | 51.0 |
| Ex. 5 | $C_{18}H_{37}$ | $OP_3$ | $OB_2/OP_2$ | $OE_{10}$ | $OE_5/OP_5$ | $OB_{10}$ | 38 | 720 | 60 | 4.0 | 5.56 | 49.6 |

Note) G/L in the floation indicates the ratio of the amount (l) of the fed foams to the amount (l) of the pulp slurry in the flotation. G/L in the flotation was 4 in the above Example 1-1 to 5 and Comparative Examples 1-1 to 2-2.

TABLE 2

| | R | \multicolumn{5}{c}{Compound of formula (I)} | Mixing ratio (% by mol) | Amount of foams of flotation rejects (ml) | Breaking rate of flotation rejects (%) | Difference in degrees of whiteness of deinked pulps between before and after flotation (pt) | Deinking rate (pt/l) | Degree of whiteness of deinked pulp (pt) |
|---|---|---|---|---|---|---|---|---|---|---|---|---|
| | | $As_X$ | $As_X/E_{m1}$ | $E_m$ | $E_{m2}/At_{R'}$ | $At_R$ | | | | | | |
| Comp. Ex. 3 | $C_{18}H_{35}$ $C_{22}H_{45}$ | $OP_5$ | | $OE_{20}$ $OE_{20}$ | | $OP_{15}$ $OP_{15}$ | 80 20 | 590 | 70 | 3.9 | 6.61 | 49.2 |
| Ex. 6 | $C_{18}H_{35}$ $C_{22}H_{45}$ | $OP_5$ $OP_5$ | $OP_3/OE_5$ $OP_3/OE_5$ | $OE_{20}$ $OE_{20}$ | $OE_2/OP_2$ $OE_2/OP_2$ | $OP_{15}$ $OP_{15}$ | 80 20 | 670 | 65 | 4.4 | 6.57 | 50.0 |
| Comp. Ex. 4 | $C_{18}H_{35}$ CH$_3$CH(CH$_2$)$_4$ \| C$_2$H$_5$ | $OP_{20}$ $OP_{20}$ | | $OE_{50}$ $OE_{50}$ | | $OP_{20}$ $OP_{20}$ | 80 20 | 590 | 74 | 3.6 | 6.06 | 48.5 |
| Comp. Ex. 7 | $C_{18}H_{35}$ CH$_3$CH(CH$_2$)$_4$ \| C$_2$H$_5$ | $OP_{15}$ $OP_{15}$ | $OP_5/OE_{10}$ $OP_5/OE_{10}$ | $OE_{38}$ $OE_{38}$ | $OP_2/OE_2$ $OP_2/OE_2$ | $OP_{18}$ $OP_{18}$ | 80 20 | 680 | 72 | 4.1 | 6.14 | 49.1 |

Note) G/L in the flotation was 4 in the above Examples 6 and 7 and Comparative Examples 3 and 4.

TABLE 3

| | R | \multicolumn{5}{c}{Compound of formula (I)} | Randomization rate (%) | Amount of foams of flotation rejects (ml) | Breaking rate of flotation rejects (%) | Difference in degrees of whiteness of deinked pulps between before and after flotation (pt) | Deinking rate (pt/l) | Degree of whiteness of deinked pulp (pt) |
|---|---|---|---|---|---|---|---|---|---|---|---|---|
| | | $As_X$ | $As_X/E_{m1}$ | $E_m$ | $E_{m2}/At_{R'}$ | $At_R$ | | | | | | |
| Comp. Ex. 5 | derived from 2-methyl-7-ethyl-4-undecanol ($C_{14}H_{29}$) | $OB_5$ | | $OE_{20}$ | | $OB_5$ | 0 | 650 | 68 | 3.6 | 5.54 | 48.9 |
| Ex. 8 | derived from 2-methyl-7-ethyl-4-undecanol ($C_{14}H_{29}$) | $OB_5$ | | $OE_{10}$ | $OE_{10}/OB_3$ | $OB_5$ | 39 | 790 | 63 | 4.1 | 5.19 | 49.3 |
| Comp. Ex. 6 | derived from 2,6,8-trimethyl-4-nonanol ($C_{12}H_{25}$) | $OP_5$ | | $OE_{20}$ | | $OP_5$ | 0 | 690 | 68 | 3.9 | 5.65 | 48.8 |
| Ex. 9 | derived from 2,6,8-trimethyl-4-nonanol ($C_{12}H_{25}$) | $OP_5$ | $OP_5/OE_{10}$ | $OE_{10}$ | | $OP_5$ | 43 | 780 | 64 | 4.2 | 5.38 | 49.3 |
| Comp. Ex. 7 | $C_{18}H_{37}$ | $OP_{70}$ | | $OE_{30}$ | | $OP_{20}$ | 0 | 400 | 87 | 3.2 | 8.00 | 47.4 |
| Ex. 10 | $C_{18}H_{37}$ | $OP_{70}$ | $OP_{10}/OE_5$ | $OE_{25}$ | | $OP_{20}$ | 12 | 500 | 81 | 3.7 | 7.40 | 48.1 |
| Comp. Ex. 8 | derived from 2,6,8-trimethyl-4-nonanol ($C_{12}H_{25}$) | $OP_{10}$ | | $OE_{200}$ | | $OP_{10}$ | 0 | 850 | 42 | 3.4 | 4.00 | 47.4 |
| Comp. Ex. 9 | derived from 2,6,8-trimethyl-4-nonanol ($C_{12}H_{25}$) | $OP_{10}$ | $OP_{10}/OE_{200}$ | | | $OP_5$ | 93 | 1660 | 26 | 3.5 | 2.11 | 47.3 |

TABLE 3-continued

| | | Compound of formula (I) | | | | | Amount of foams of flotation rejects (ml) | Breaking rate of flotation rejects (%) | Difference in degrees of whiteness of deinked pulps between before and after flotation (pt) | Deinking rate (pt/l) | Degree of whiteness of deinked pulp (pt) |
|---|---|---|---|---|---|---|---|---|---|---|---|
| | R | $As_X$ | $As_X/E_{m1}$ | $E_m$ | $E_{m2}/At_R$ | $At_R$ | Randomization rate (%) | | | | |
| Ex. 11 | derived from 2,6,8-trimethyl-4-nonanol ($C_{12}H_{25}$) | $OP_{10}$ | $OP_5/OE_{10}$ | $OE_{190}$ | | $OP_{10}$ | 7 | 1000 | 40 | 3.6 | 3.60 | 48.2 |
| Comp. Ex. 10 | $C_6H_{13}$ | $OB_{10}$ | | $OE_{20}$ | | $OB_3$ | 0 | 770 | 59 | 3.1 | 4.03 | 47.5 |
| Ex. 12 | $C_6H_{13}$ | $OB_{10}$ | | $OE_{10}$ | $OE_{10}/OB_5$ | $OB_3$ | 39 | 940 | 53 | 3.5 | 3.72 | 48.3 |

Note) G/L in the flotation was 4 in the above Examples 8 to 12 and Comparative Examples 5 to 10.

TABLE 4

| | | | Compound of formula (I) | | | | | Amount of foams of flotation rejects (ml) | Breaking rate of flotation rejects (%) | Difference in degrees of whiteness of deinked pulps between before and after flotation (pt) | Deinking rate (pt/l) | Degree of whiteness of deinked pulp (%) |
|---|---|---|---|---|---|---|---|---|---|---|---|---|
| | | R | $As_X$ | $As_X/E_{m1}$ | $E_m$ | $E_{m2}/At_n$ | $At_n$ | Randomization rate (%) | | | | |
| Ex. | 13-1 | $C_{18}H_{35}$ | $OP_{10}$ | $OE_5/OP_5$ | $OE_{20}$ | | $OP_{10}$ | 22 | 600 | 65 | 4.0 | 6.67 | 50.4 |
| Ex. | 13-2 | $C_{12}H_{25}$ | $OP_5$ | $OE_5/OP_5$ | $OE_{25}$ | | $OP_{10}$ | 20 | 650 | 73 | 4.3 | 6.62 | 50.9 |
| Ex. | 13-3 | $C_{16}H_{33}$ | $OP_8$ | $OE_{10}/OP_5$ | $OE_{20}$ | | $OP_{10}$ | 25 | 630 | 70 | 4.2 | 6.67 | 50.3 |
| Comp. Ex. | 11-1 | $C_{15}H_{33}$ | $OP_8$ | $OE_{30}/OP_{22}$ | | | | 87 | 800 | 55 | 3.8 | 4.75 | 50.0 |
| Comp. Ex. | 11-2 | $C_{16}H_{33}$ | | $OE_{30}/OP_{13}$ | | | $OP_{17}$ | 72 | 900 | 43 | 3.9 | 4.33 | 49.9 |
| Comp. Ex. | 12-1 | $C_{12}H_{25}$ | | | $OE_5$ | $OE_{25}/OP_{20}$ | | 10 | 840 | 46 | 3.8 | 4.52 | 49.8 |
| Comp. Ex. | 12-2 | $C_{12}H_{25}$ | | $OE_{30}/OP_{20}$ | | | | 100 | 960 | 32 | 4.0 | 4.17 | 49.9 |
| Comp. Ex. | 13-1 | $C_{18}H_{35}$ | $OP_{20}$ | | $OE_{25}$ | | | 0 | 360 | 75 | 2.2 | 6.11 | 47.0 |
| Comp. Ex. | 13-2 | $C_{18}H_{35}$ | | | $OE_{25}$ | | $OP_{20}$ | 0 | 480 | 63 | 3.0 | 6.25 | 48.9 |

Note) G/L in the flotation was 4 in the above Examples 13-1 to 13-3 and Comparative Examples 11-1 to 13-2.

Example 14

The performances of a compound of the following formula used as the deinking agent were evaluated in the same manner as in the above-described Examples. The results are given in Table 5. Also in this Example, G/L in the flotation was 4.

Deinking agent:

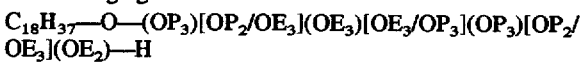

$C_{18}H_{37}-O-(OP_3)[OP_2/OE_3](OE_3)[OE_3/OP_3](OP_3)[OP_2/OE_3](OE_2)-H$ wherein "( )" indicates the block arrangement and "[ ]" indicates the random arrangement, and each of the numbers of the oxyalkylene groups is represented by the molar number of alkylene oxide added per mol of the hydroxyl group-containing compound as the starting material.

TABLE 5

| | |
|---|---|
| Amount of foams of flotation rejects (ml) | 730 |
| Breaking rate of flotation rejects (%) | 64 |
| Difference in degrees of whiteness of deinked pulps between before and after flotation (pt) | 3.5 |
| Deinking rate (pt/l) | 4.79 |
| Degree of whiteness of deinked pulp (%) | 48.0 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A deinking agent for reclaiming waste paper represented by the following formula (I):

R—O—X—H  (I)

wherein R represents a residue formed by removing one hydroxyl group from either a phenolic compound which is optionally substituted with a linear or branched alkyl or alkenyl group having 6 to 16 carbon atoms or a higher alcohol having a linear or branched alkyl or alkenyl group having 8 to 24 carbon atoms, X represents a polyoxyalkylene group consisting of at least three units arranged in block and at least one unit arranged at random, with both ends of each random arrangement unit being adjacent to a block arrangement unit, wherein the block arrangement unit is selected from the group consisting of:

(1) $[E_m]$ which is a (poly)oxyethylene unit arranged in block wherein m is the number of oxyethylene groups and is at least one; and (2) $[(As)_x]$ which represents an oxyalkylene unit $C_sH_{2s}O$, wherein $s \geq 3$, arranged in block and wherein $x \geq 1$, wherein said at least three block arrangement units contain at least one $(E)_m$ and at least one $(As)_x$, and wherein said random arrangement unit is selected from the group consisting of:

(3) $[(E)_{m'}/(As')_{x'}]$ is a unit arranged at random, wherein $(E)_{m'}$ represents an oxyethylene group and $(As')_{x'}$ represents an oxyalkylene group $C_{s'}H_{2s'}O$, and wherein $m' \geq 1$, $x' \geq 1$ and $s' \geq 3$; and (4) $[(As'')_{x''}/(As''')_{x'''}]$ is a unit arranged at random, wherein $As''$ represents an oxyalkylene group $C_{s''}H_{2s''}O$, and $As'''$ represents a different oxyalkylene group $C_{s'''}H_{2s'''}O$, wherein $x'' \geq 1$, $x''' \geq 1$, $s'' \geq 3$, $s''' \geq 3$ and $s'' \neq s'''$.

2. The deinking agent for reclaiming waste paper according to claim 1, wherein both ends of the random arrangement unit in X of formula (I) are adjacent to a block arrangement unit consisting of the same oxyalkylene group of the random arrangement unit.

3. The deinking agent for reclaiming waste paper according to claim 1, wherein R in the formula (I) is a linear or branched alkyl or alkenyl group having 8 to 24 carbon atoms.

4. The deinking agent for reclaiming waste paper according to claims 2 or 3, wherein X is a polyoxyalkylene group represented by the following formula (II):

$[(As)_x][(As)_{x'}/E_{m1}][E_m][E_{m2}/(At)_{n'}][(At)_n]$ (II)

wherein As represents $C_sH_{2s}O$, s is 3 or 4, At represents $C_tH_{2t}O$, t is 3 or 4, E represents $C_2H_4O$, x, x', m, m1, m2, n and n' each represents a number of the oxyalkylene group which is as follows: $x \geq 1$, $x' \geq 1$, m1+m+m2$\geq 5$, m1$\geq 1$, m2$\geq 2$, n$\geq 1$, n'$\geq 1$ and $[(As)_{x'}/E_{m1}]$ and $[E_{m2}/(At)_{n'}]$ are each a unit arranged at random.

5. The deinking agent for reclaiming waste paper according to claim 4, wherein each of the numbers of the oxyalkylene group in formula (II) satisfy the following conditions (1) to (5):

(1) $x + x' < 300$,
(2) $m1 + m + m2 < 300$,
(3) $n' + n < 300$,
(4) $x + x' + m1 + m + m2 + n' + n = 12$ to 900, and
(5) a randomization rate of

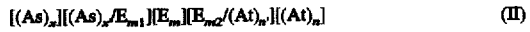

$$5 \leq \frac{x' + m1 + m2 + n'}{x + x' + m1 + m + m2 + n' + n} \times 100 < 80.$$

6. The deinking agent for reclaiming waste paper according to claim 4, wherein each of the numbers of the oxyalkylene group in formula (II) satisfy the following conditions (6) to (11):

(6) $5 \leq x + x' < 50$,
(7) $m1 + m + m2 < 50$,
(8) $5 \leq n' + n < 50$,
(9) $(m1 + m + m2)/(x + x' + n' + n) = 3/1$ to $1/2$,
(10) $x + m + n = 12$ to 200, and
(11) a randomization rate of $$5 \leq \frac{x' + m1 + m2 + n'}{x + x' + m1 + m + m2 + n' + n} \times 100 < 60.$$

7. The deinking agent for reclaiming waste paper according to claim 4, wherein both As and At are $C_3H_6O$.

8. The deinking agent for reclaiming waste paper according to claims 2 or 3, wherein X is a polyoxyalkylene group represented by the following formula (III):

$[(As)_x][E_m][E_{m2}/(At)_{n'}][(At)]$ (III)

wherein As represents $C_sH_{2s}O$, s is 3 or 4, At represents $C_tH_{2t}O$, t is 3 or 4, E represents $C_2H_4O$, x, m, m2, n and n' each represent a number of the oxyalkylene group which is as follows: $x \geq 1$, m+m2$\geq 5$, m$\geq 1$, m2$\geq 1$, n$\geq 1$, n'$\geq 1$ and $[E_{m2}/(At)_{n'}]$ is a unit arranged at random.

9. The deinking agent for reclaiming waste paper according to claim 4, wherein each of the numbers of the oxyalkylene group in formula (III) satisfy the following conditions (1) to (5):

(1) $x < 300$,
(2) $m + m2 < 300$,
(3) $n' + n < 300$,
(4) $x + m + m2 + n' + n = 12$ to 900, and
(5) a randomization rate of

$$5 \leq \frac{m2 + n'}{x + m + m2 + n' + n} \times 100 < 80.$$

10. The deinking agent for reclaiming waste paper according to claim 8, wherein each of the numbers of the oxyalkylene group in formula (III) satisfy the following conditions (6) to (11):

(6) $5 \leq x < 50$,
(7) $m + m2 < 50$,
(8) $5 \leq n' + n < 50$,
(9) $(m + m2)/(x + n' + n) = 3/1$ to $1/2$,
(10) $x + m + n = 12$ to 200, and
(11) a randomization rate of $$5 \leq \frac{m2 + n'}{x + m + m2 + n' + n} \times 100 < 60.$$

11. The deinking agent for reclaiming waste paper according to claim 8, wherein both As and At are $C_3H_6O$.

12. The deinking agent for reclaiming waste paper according to claims 2 or 3, wherein X is a polyoxyalkylene group represented by the following formula (IV):

$[(As)_x][(As)_{x'}/E_{m1}][E_m][(At)_n]$ (IV)

wherein As represents $C_sH_{2s}O$, s is 3 or 4, At represents $C_tH_{2t}O$, t is 3 or 4, E represents $C_2H_4O$, x, x', m, m1, and n each represent a number of the oxyalkylene group which is as follows: $x \geq 1$, $x' \geq 1$, $m1+m \geq 5$, $m1 \geq 1$, $m \geq 1$, $n \geq 1$, and $[(As)_{x'}/E_{m1}]$ is a unit arranged at random.

13. The deinking agent for reclaiming waste paper according to claim 12, wherein each of the numbers of the oxyalkylene group in formula (IV) satisfy the following conditions (1) to (5):

(1) $x + x' < 300$,
(2) $m_1 + m < 300$,
(3) $n < 300$,
(4) $x + x' + m1 + m + n = 12$ to 900, and
(5) a randomization rate of $$5 \leq \frac{x' + m1}{x + x' + m1 + m + n} \times 100 < 80.$$

14. The deinking agent for reclaiming waste paper according to claim 12, wherein each of the numbers of the oxyalkylene group in formula (IV) satisfy the following conditions (6) to (11):

(6) $5 \leq x + x' < 50$,
(7) $m1 + m < 50$,
(8) $5 \leq n < 50$,
(9) $(m1 + m)/(x + x' + n) = 3/1$ to $1/2$,
(10) $x + m + n = 12$ to 200, and
(11) a randomization rate of $$5 \leq \frac{x' + m1}{x + x' + m1 + m + n} \times 100 < 60.$$

15. The deinking agent for reclaiming waste paper according to claim 12, wherein both As and At are $C_3H_6O$.

16. The deinking agent for reclaiming waste paper according to claim 1, wherein each of the block units consists of at least two oxyalkylene groups, and the random arrangement units consists of at least one oxyalkylene group and at least two other oxyalkylene groups.

17. A method for deinking waste paper which comprises applying a deinking agent to waste paper, represented by the following formula (I):

$$R-O-X-H \qquad (I)$$

wherein R represents a residue formed by removing one hydroxyl group from either a phenolic compound which is optionally substituted with a linear or branched alkyl or alkenyl group having 6 to 16 carbon atoms or a higher alcohol having a linear or branched alkyl or alkenyl group having 8 to 24 carbon atoms, X represents a polyoxyalkylene group consisting of at least three units arranged in block and at least one unit arranged at random, with both ends of each random arrangement unit being adjacent to a block arrangement unit, wherein the block arrangement unit is selected from the group consisting of:

(1) $[E_m]$ which is a (poly)oxyethylene unit arranged in block wherein m is the number of oxyethylene groups and is at least one; and (2) $[(As)_x]$ which represents an oxyalkylene unit $C_sH_{2s}O$, wherein $s \geq 3$, arranged in block and wherein $x \geq 1$, wherein said at least three block arrangement units contain at least one $(E)_m$ and at least one $(As)_x$, and wherein said random arrangement unit is selected from the group consisting of:

(3) $[(E)_{m'}/(As')_{x'}]$ is a unit arranged at random, wherein $(E)_{m'}$ represents an oxyethylene group and $(As')_{x'}$ represents an oxyalkylene group $C_{s'}H_{2s'}O$, and wherein $m' \geq 1$, $x' \geq 1$ and $s' \geq 3$; and (4) $[(As'')_{x''}/(As''')_{x'''}]$ is a unit arranged at random, wherein As'' represents an oxyalkylene group $C_{s''}H_{2s''}O$, and As''' represents a different oxyalkylene group $C_{s'''}H_{2s'''}O$, wherein $x'' \geq 1$, $x''' \geq 1$, $s'' \geq 3$, $s''' \geq 3$ and $s'' \neq s'''$.

* * * * *